Dec. 19, 1967     L. H. MORIN     3,358,324
MACHINE FOR PRODUCING LOOPED ENDS IN FISHHOOK LEADERS
Filed Sept. 8, 1965     6 Sheets-Sheet 1

INVENTOR.
LOUIS H. MORIN
BY
Howard R. Thompson
ATTORNEY

Dec. 19, 1967  L. H. MORIN  3,358,324
MACHINE FOR PRODUCING LOOPED ENDS IN FISHHOOK LEADERS
Filed Sept. 8, 1965  6 Sheets—Sheet 3

INVENTOR.
LOUIS H. MORIN
BY
Howard E. Thompson
ATTORNEY Dec. 19, 1967     L. H. MORIN     3,358,324
MACHINE FOR PRODUCING LOOPED ENDS IN FISHHOOK LEADERS
Filed Sept. 8, 1965     6 Sheets-Sheet 5

INVENTOR.
LOUIS H. MORIN
BY
Howard T. Thompson
ATTORNEY

INVENTOR.
LOUIS H. MORIN
BY Howard E. Thompson
ATTORNEY

United States Patent Office 3,358,324
Patented Dec. 19, 1967

3,358,324
MACHINE FOR PRODUCING LOOPED ENDS
IN FISHHOOK LEADERS
Louis H. Morin, Bronx, N.Y., assignor of one-fourth to
Madeline F. McGill, Denver, Colo., and one-fourth
to J. R. Hanna, Bronxville, N.Y.
Filed Sept. 8, 1965, Ser. No. 485,814
18 Claims. (Cl. 18—5)

This invention relates to machines for simultaneously forming pairs of fishhook leaders having looped ends therein and in simultaneously trimming the strand in forming the independent looped leaders and, at the same time, ejecting each of the formed leaders and collecting and storing the same upon rod-like catchers detachably mounted in the machine adjacent each of the forming and molding stations of the machine.

More particularly, the invention deals with a machine of the character described having, at each of the stations, pairs of dies movable toward and from each other in forming moldings upon the twisted portions of the strands adjacent the loops formed therein and also providing, at said stations, means for forming the loops and twisting the strands adjacent the loops, preparatory to the molding operations performed upon said twist.

Still more particularly, the invention deals in a machine of the character described, having a strand feeder arm moving back and forth between the spaced stations for engagement with loop forming members on the twister rods at said stations and, still further, in the provision of means for ejecting or displacing the looped portions of the strands from the rods and for delivery upon catcher rods positioned at said stations.

The novel features of the invention will be best understood from the following description, when taken together with the accompanying drawings, in which certain embodiments of the invention are disclosed and, in which, the separate parts are designated by suitable reference characters in each of the views and, in which.

In illustrating one adaptation and use of my invention, I have shown a machine which is specifically designed for forming loops at end portions of a leader or snell strand, such as commonly attached to a fishhook. It will be apparent, however, that the machine can be utilized in forming other types and kinds of strand-like products and the particular type of dies or die units employed will be modified to suit the different products being produced. Still further, it will be apparent that different types of strand forming rods or elements can be employed and shaped to suit the end product being produced.

Figure 1:
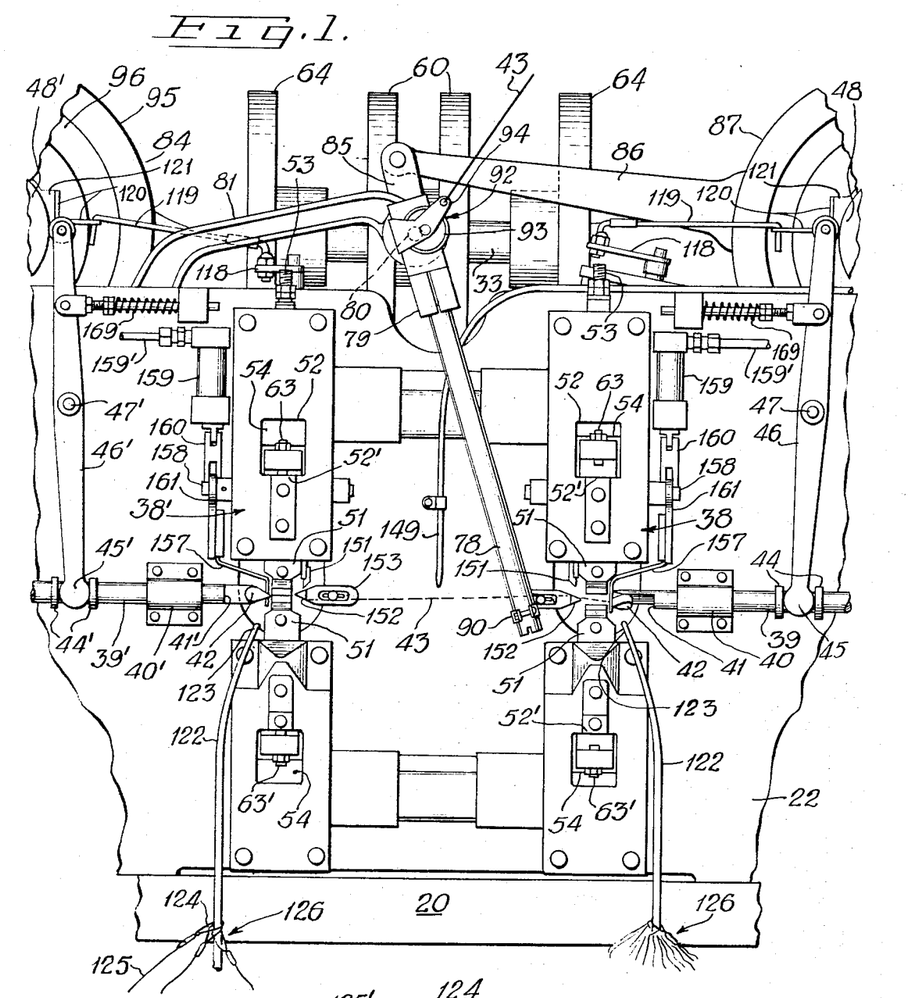
FIG. 1 is a diagrammatic front view generally positioning primary parts of the machine, without reference to detail.
Figure 2:
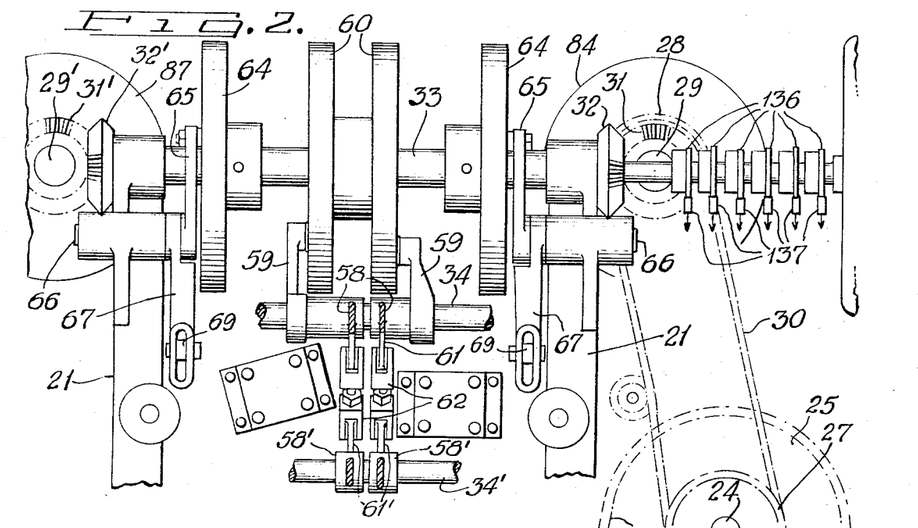
FIG. 2 is a rear view primarily illustrating the left side of the machine and illustrating, in part, diagrammatically the drives from the longitudinal cam shaft at the rear portion of the machine.
Figure 3:
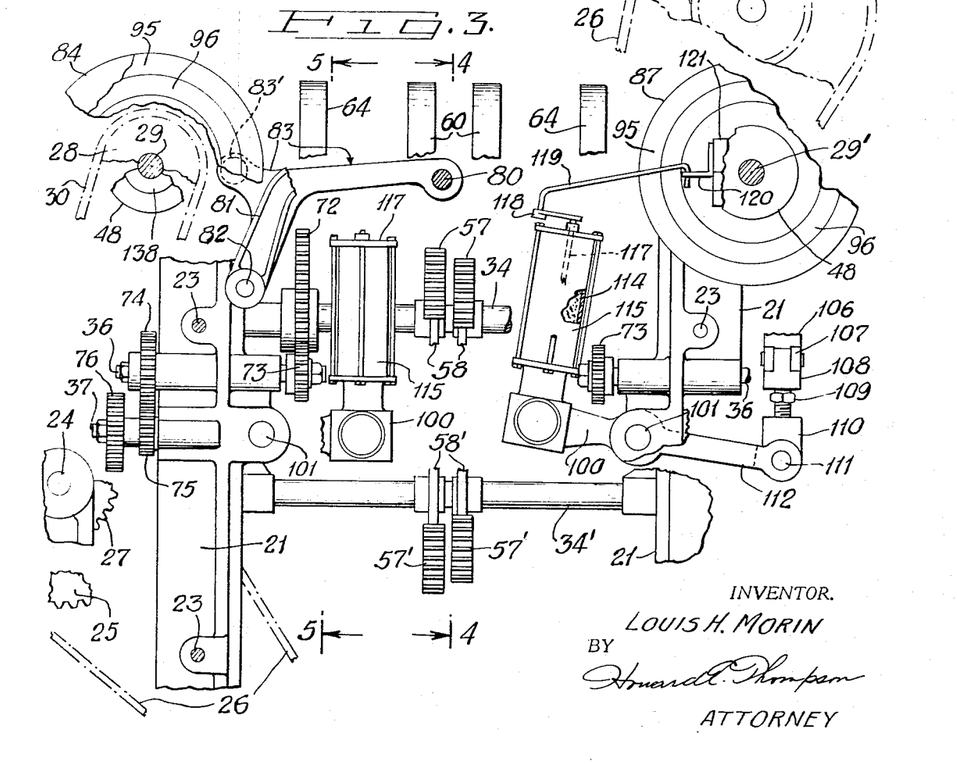
FIG. 3 is a diagrammatic front view of the machine, with the front plate, illustrated in FIG. 1, removed and generally positioning the cams of the rear cam shaft, shown in FIG. 2.

Considering FIGS. 1, 2 and 3 of the drawing, arranged upon a suitably supported base 20, FIG. 1, are two generally similar upstanding side frames 21, FIGS. 2 and 3, supporting at the front of the machine a front plate 22 attached to the frames, as seen, in part, at 23 representing the holding bolts in FIG. 3 of the drawing.

Figure 6:
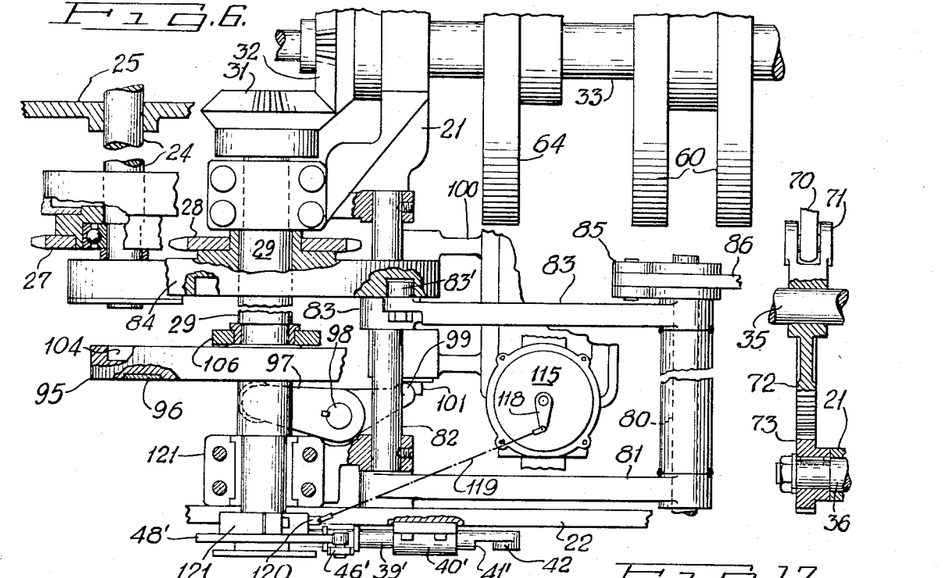
FIG. 6 is a diagrammatic plan view of the lefthand portion of the machine, showing one of the transverse cam shafts of the machine, with parts broken away and parts shown in section and showing part of the right side in section.
Figure 7:
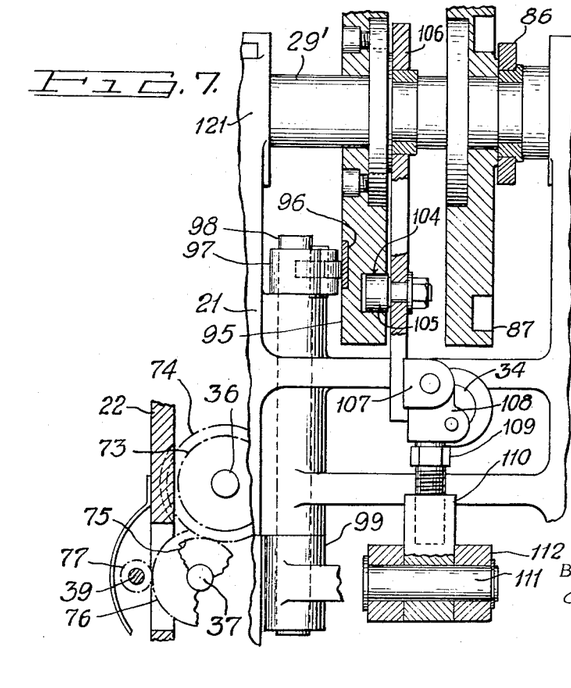
FIG. 7 is a diagrammatic view of part of the right end of the machine, with parts of the construction broken away and in section.

The machine employs a suitably supported drive shaft 24, as seen in FIGS. 2 and 6, this shaft having a sprocket 25 with a chain drive, as indicated in dot-dash lines at 26, FIG. 2, to a drive motor supported below the base 20 of the machine.

Supported upon the drive shaft 24 is another sprocket 27, note FIG. 6, which has a chain drive to a sprocket 28 on one of the transverse cam shafts 29. The chain between these sprockets is indicated by the dot-dash lines 30 in FIG. 2 of the drawing. Another cam shaft, similar to the shaft 29, is employed on the right side of the machine and this shaft is identified by the reference character 29′ in FIG. 3 but, in the detail description of one of these shafts and its associated parts, the same references will apply to the other shaft 29′ and, in some instances, primed references will be used.

At the rear end of the shafts 29, 29′ are bevelled gears 31, 31′ meshing with similar gears 32, 32′ fixed to ends of a longitudinal rear cam shaft 33.

Suitably supported in the side frames 21 are similar upper and lower horizontal shafts 34, 34′, best shown in FIGS. 3 and 4 of the drawing, upon which the die operating mechanism, later described, is supported.

Suitably supported in the frames 21 of the machine are two shafts 36 and 37, these shafts being primarily shown at the left side of the machine and support the twister gears and gear segments, as later described. The shafts in question are best seen in FIG. 5 of the drawing.

Figures 8, 9:
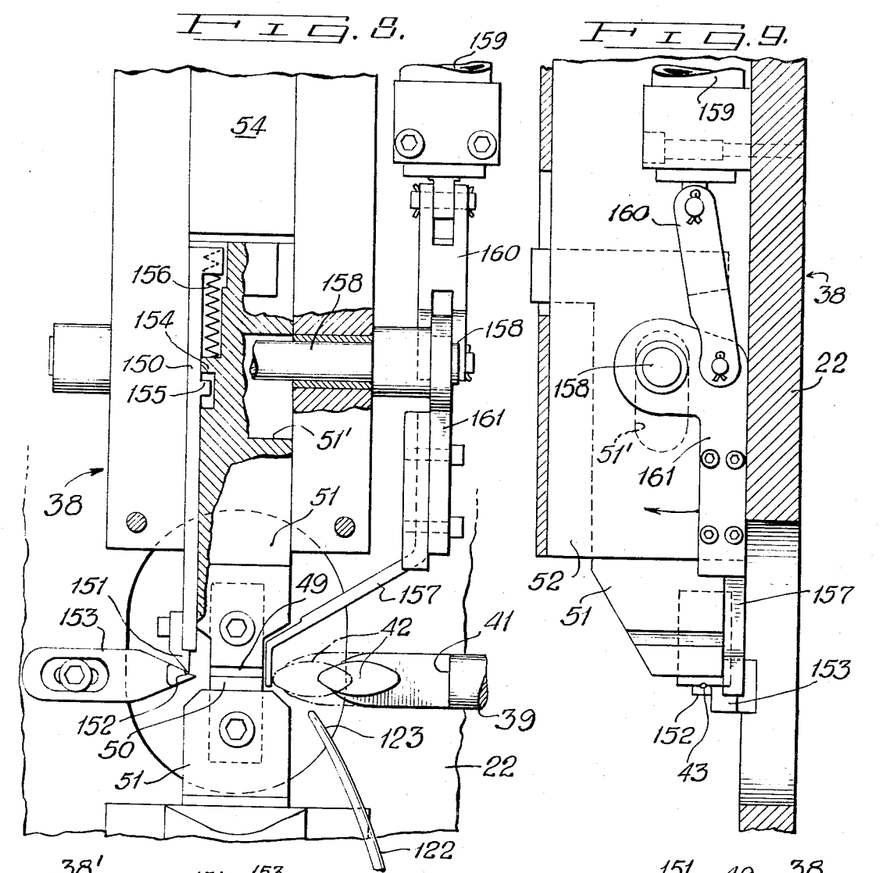
FIG. 8 is an enlarged detail view of one of the die assemblages and parts associated therewith, with parts of the construction broken away and shown in section and omitting a removable cover shown in FIG. 1.
FIG. 9 is a side view of the structure shown in FIG. 8, with the front plate of the machine shown in section.
Figures 10, 11:
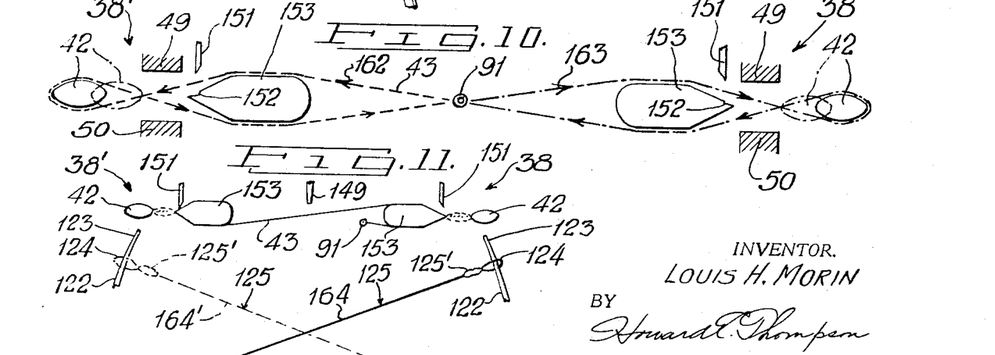
FIG. 10 is a schematic view illustrating diagrammatically the feed of the nylon strand with respect to the two twisting and molding stations.
FIG. 11 is a view, similar to FIG. 10, illustrating parts of one of the stations in a different position from that shown in FIG. 10.

Considering now FIGS. 1 and 7 to 11, inclusive, at 38, 38' I have shown two twisting and molding stations, which are generally outlined in FIG. 1 of the drawing, and an enlarged detail of the station 38 is shown in FIGS. 8 and 9 of the drawing. Slidably and rotatably supported on the outer face of the front plate 22 are looping and twisting rods 39, 39', parts of the supports of which are seen at 40, 40'. Inner adjacent ends of these rods are recessed, as seen at 41, 41', and disposed within the recesses are elliptical loop forming members 42, around which a nylon or similar fish hook leader strand 43, FIG. 10, is adapted to be wound. The rods 39, 39' have pairs of collars 44, 44' engaged by ends 45, 45' of levers 46, 46' pivoted to the front plate, as seen at 47, 47'. The upper ends of these levers support rollers which operatively engage cams 48, 48' on the shafts 29', 29, respectively. These cams control intermittent longitudinal movement of the rods 39, 39' for purposes later described.

Considering the station 38, best seen in FIGS. 1, 4, 8 and 9, it will apear that this station has suitably supported upper and lower dies 49 and 50 slidably supported on the front plate 22. The supports 51 for each of these dies are slidably mounted in casings 52. Coupled with the supports 51 are rods 53, on which are movable racks 54 through the action of spring means 55, as best seen at the upper portion of FIG. 4 of the drawing. Operatively engaging each of the racks are pinions 56 actuated by gear segments 57, 57' at the ends of levers 58, 58' pivoted upon the shaft 34. The lever 58 includes a long arm 59 having a roller operatively engaging the cam 60, the lever 58 also carrying a short arm 61, with which is coupled a turnbuckle link 62 engaging the generally similar short arm 61' on a lever 58', including a gear segment 57', the latter controlling operation of the lower die, as will be apparent. It will be understood that the lower die is actuated through the means, similar to that shown at the top of FIG. 4 and, therefore, no further detail description is deemed to be necessary.

Coupled with the support 51 for each of the dies is an adjustable stop screw 63, 63' engaging an offset 52' on the casings 52 in checking closing movement of the dies 49 and 50. In this description, reference has been made to the dies of the station 38. It will be understood that similar assemblages are provided for the operation of the dies in the station 38' and, as the parts are identical, like references will be applied to like parts.

Parts of the lever structure, above described, are illustrated, in part, simply for location in FIGS. 2 and 3 of the drawing.

Figures 4, 5:
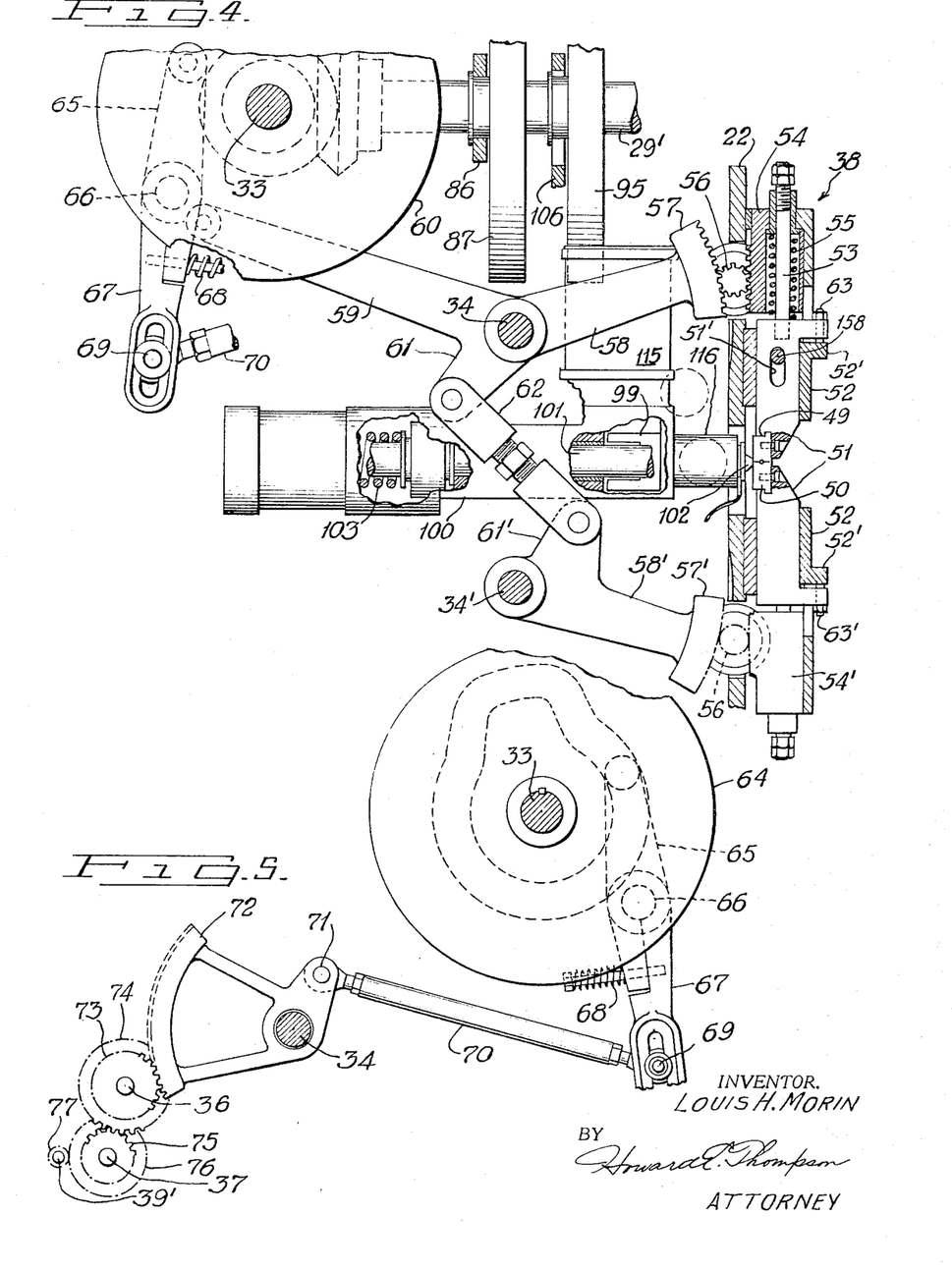
FIG. 4 is a schematic view, generally on the line 4—4 of FIG. 3, illustrating one of the die operating units of the machine, with parts of the construction broken away and shown in section and showing the dies in closed position, as at the left side of FIG. 1.
FIG. 5 is a schematic sectional view on the line 5—5 of FIG. 3 illustrating one of the twist units or assemblages.

Considering FIGS. 2, 3, 5 and 6 of the drawing, it will appear that fixed to the shaft 33 are what might be termed twister operating cams 64, with which, mechanism diagrammatically shown in FIG. 5 operates. Each of these mechanisms include a lever 65 engaging the cam 64, the lever being pivoted to the frames 21, as at 66, and the associated lever 67 is also arranged on the pivotal support 66 and is tensioned with lever 65, as by a coil spring 68, as shown in FIG. 5. Adjustably supported in the end portion of lever 67 is the pivot end 69 of a rod 70, the other end of which is pivoted to an arm 71 of a gear segment 72 mounted on the shaft 34. This segment operatively engages a gear 73 on the shaft 36. On the outer end of this shaft is another gear 74 operatively engaging a gear 75 on the shaft 37. On the shaft 37 is a gear 76 operatively engaging a pinion 77 on the end portion of the rod 39 or the rod 39', as will be apparent. This mechanism controls periodic spinning of the rods 39, 39' in providing a twist or winding in the strand 43, preparatory to formation of a casting or molding on this twist, as later described.

Considering FIGS. 1, 6, 10, 11 and 12 of the drawing, in these figures, 78 shows the strand feeder arm for feeding the strand 43 back and forth between the two stations 38, 38'. This arm is in the form of a tube, best shown in FIG. 12, the upper end being supported in an offset bracket 79 arranged upon a shaft 80 supported on an arm 81 pivoted to a shaft 82, as best seen in FIG. 6.

Figures 12, 13, 14, 14A, 15, 15A, 16:
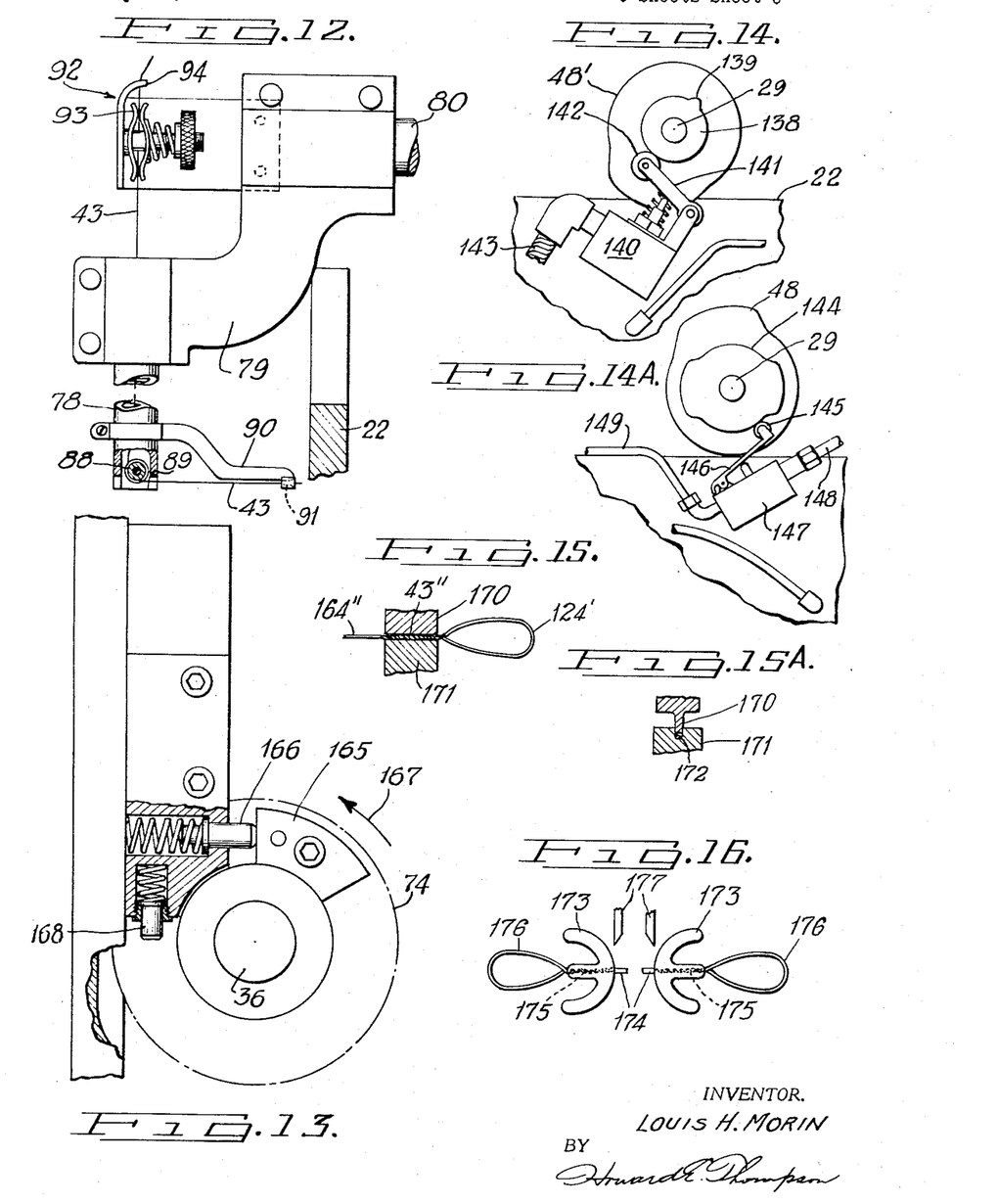
FIG. 12 is an enlarged detail view of the nylon strand tensioning and delivery or feed unit of the machine, parts of the construction being broken away and part in section.
FIG. 13 is an enlarged detail view of the twister shaft stop, part of the construction being shown in section.
FIG. 14 is a diagrammatic front view of the means controlling precise stoppage of the machine.
FIG. 14A is a diagrammatic front view of the means for actuating an air blast in the discharge of the looped snell.
FIG. 15 is a diagrammatic sectional detail view showing a modified form of twist securing.
FIG. 15A is a sectional view through the showing in FIG. 15.
FIG. 16 is a diagrammatic view illustrating the modified forms of end products having looped strands fixed thereto.

Mounted on the inner portion of the shaft 80 is an arm 83 pivoted on the shaft 82, the arm 83 having an offset supporting a roller 83' at its free end, note FIG. 6. Considering FIG. 6, it will appear that the sprocket 28 is fixed to the cam 84. Fixed to the rear end of the shaft 80 is an upwardly extending arm 85, note FIG. 1, with which is pivotally coupled a cam follower 86, which operatively engages a cam 87, generally in alinement with the cam 84 but arranged upon the shaft 29'. The cam 87 controls back and forth swinging movement of the feed arm 78 from station to station; whereas, the cam 84 controls upward and downward movement of the arm 78 in looping the strand 43 around the loop forming members 42 of the rods 39, 39'. Supported on the lower end of the arm 78 is a transverse roller 88, preferably having free bearing mountings in the arm 78 for free passage of the strand 43 around the roller 88. The lower end of the arm 78 is slotted, as seen at 89, for passage of the strand 43 therethough, as seen at FIG. 12. Adjustably clamped on the lower end portion of the arm 78 is a strand guiding finger 90, having an eye end 91 through which the strand passes for accurate delivery and winding of the strand on the members 42, 42'.

Supported in connection with the bracket 79, note FIG. 12, is a standard thread or strand tensioning device, generally identified by the reference character 92. This device includes a resiliently controlled tension element 93, through which the strand 43 passes, the strand being guided by a finger 94 and the strand comes from a suitably supported supply on the machine, preferably at the upper portion of the machine.

Suitably fixed to the shafts 29, 29' are cams 95. In view of the fact that these cams and the mechanisms actuated thereby are identical, like references will be used, keeping in mind that the showing of one of the assemblages is most complete in FIG. 7, where the cam 95 is mounted on the shaft 29' and is shown only, in part, in FIG. 6, as there is no need of duplicating the more complete showing.

On the outer or front face of the cam 95 is a surface cam portion 96 engaged by a roller at one end of a lever 97 keyed to a shaft 98 mounted in the frame 21. Also keyed to the shaft 98 is a lower forked lever 99, which bears upon an injection cylinder frame 100, note FIG. 6, slidably mounted on a suitably supported rod 101. The lever 99 serves to move a nozzle 102 of the injection cylinder away from the dies 49 and 50 after a molding operation, this action being against a suitably supported and backed spring 103 engaging the inner portion of the frame 100. This spring is tensioned to support the nozzle 102 in engagement with the dies, as will be apparent.

On the other surface of the cam 95 is a cam groove 104 engaged by a roller 105 fixed to a cam follower 106. The follower has, at its lower end, a fork 107, note FIG. 7, with which a link 108 is pivotally coupled. Coupled with the link 108 is a turnbuckle 109 engaging a link 110 pivoted, as seen at 111, to a forked arm extension 112 of the frame 100. This mechanism serves to tilt the frame 100 back and forth on the rod 101, note FIG. 3. This operation serves to agitate the molding material 114 in transparent containers 115 suitably supported upon the upper forward end portions of the frame 100 for delivery of the molding material 114 to the heated end 116 of the injection cylinder, note FIG. 4. No detail showing or description of the injection cylinder is made, as these structures are well-known in the art.

At this time, it is to be noted that arranged in each of the containers 115 and extending through the upper end thereof is an agitator rod 117 for agitating the molding material 114. Coupled with the upper end of the rod is an arm 118, with which a link 119 is coupled. This link is fixed to a bracket 120 secured to the front bearings 121 for the shafts 29, 29', note FIGS. 1 and 6, so that, as the containers are tilted back and forth, the agitator will be oscillated within the containers to maintain the molding material 114 free at all times for delivery or feed into the injection cylinders.

Figure 17:
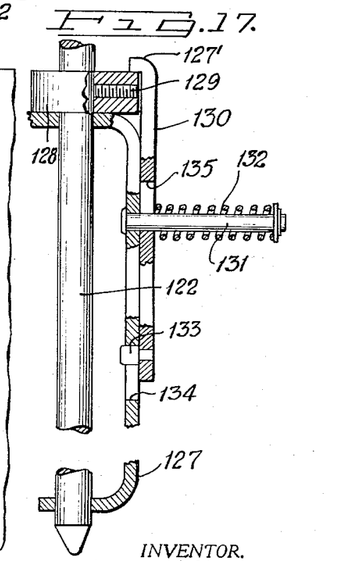
FIG. 17 is an enlarged detail view of the means for detachably supporting the workpiece catcher finger.

Considering FIGS. 1 and 17 of the drawing, it will appear that two workpiece catch fingers 122 are employed, having inwardly curved and contracted upper ends 123, which are positioned adjacent the dies to receive the loop end 124 of the snell workpieces 125 as they are discharged from the machine by means later described, note FIG. 10. The workpieces fall by gravity and collect on the lower ends of the catch fingers, as diagrammatically seen, in part, at 126 in FIG. 1, adjacent a supporting plate 127 for the fingers 122, as seen in FIG. 17. The workpieces collect against a collar 128 fixed to the finger 122 by a setscrew 129, so that, when the finger is removed from the plate 127, the sleeve 128 will support the collected workpieces on the finger for transporting to another station, where these workpieces or fish hook snells can be attached to hooks in the production of snelled fish hooks.

Mounted in connection with the plate 127 is a retainer 130 slidably mounted upon a pin 131 fixed to the plate 127, a coil spring 132 being arranged on the pin to urge the plate 127 into engagement with the sleeve, so that the upper hook end 127' of the plate will engage the collar as shown. In removing a finger 122 with the workpieces thereon from the plate 127, the upper end of the plate 127 is simply swung outwardly by hand against the action of the spring 132 to free the sleeve and, thus, facilitate removal of the finger 122. It will be noted that the lower end of the retainer has a key pin 133 operating in a slot 134 in the plate 127 to provide pivotal, as well as sliding movement of the retainer on the plate, the plate having another slot 135 for movement over the pin 131.

Considering FIG. 2 of the drawing, it will appear that a series of cams 136 are arranged upon an extension of the shaft 33 at the one side of the machine. These cams actuate a series of electric switches 137 which, in turn, actuate electric solenoid valves, not shown, in controlling the several air actuated mechanisms of the machine.

Considering FIG. 14 of the drawing, on the shaft 29 is a cam 138 having a raised projection 139 which actuates an electric switch 140 through a lever 141 and a roller 142 which engages the cam. The electric switch 140 actuates through a cable 143 and electric clutch of the machine, not shown, so as to stop said machine when the electric clutch is thrown into the stop position.

The purpose of the bump 139 on the cam 138 is to stop the machine at a precise point in its cycle, in other words, when projection 139 engages the roller 142. The purpose of this is that, when the machine is stopped, it is stopped at a point where both nozzles are out of contact with the dies, so that the nozzles will not freeze. In other words, the machine has to be stopped to remove the fingers 122 for replacement by new fingers to collect an additional supply of the workpieces. It will also be understood that the machine can be stopped for other purposes, such as replenishing the molding plastic material in the containers 115.

Considering FIG. 14A, there is a cam 144 which, when the cam rotates, actuates the roller 145 on the lever 146 to open the air valve 147, allowing air from a source of supply passing through the pipe 148 to pass into the pipe 149 to blow off the tail of the snell workpiece 125. The purpose of this is that, sometimes, under humid conditions, the tail of the snell has a tendency to curl and it might become entangled with associated parts of the machine as and when the finished workpiece is being ejected. It will be noted that the cam 144 has dual surfaces for actuating the blower 149 twice during each cycle of operation of the machine.

In operation of the racks 54 for movement of the dies, it will appear from a consideration of FIG. 8 that a knife slide 150 is caused to actuate a knife 151 against a hardened anvil 152 on a stationary anvil holder 153. After the molding shot has taken place and, through proper timing, the rack 54 advances further downward. This advanced movement causes the edge 154 to contact an offset shoulder 155 on the slide 150 against the action of a spring 156. In this operation, the knife 151 will cut the upper strand of the snell which, at the time, is lying over the anvil 152.

On completing the above operation, the dies will be moved into open position and a discharge lever 157 is swung forwardly to eject the loop of the snell from the member 42 and, in this ejection, the loop passes onto the end 123 of the finger 122, as will appear from the dotted line showing of the member 42 in FIG. 8 of the drawing. The lever 157 is pivoted on the shaft 158 and the lever is actuated by an air cylinder 159 driving a link 160 pivoted to the holder 161 which supports the lever 157. Air supply to the cylinder 159 is illustrated, in part, at 159' in FIG. 1 of the drawing. The monofilament or strand 43 is guided through the eye 91 note FIG. 10, and moves in the direction of the arrow 162. This movement is upwardly over the stationary anvil 153 at station 38' downwardly between the dies and under and around the member 42, then downwardly between the open dies and under the stationary anvil 153, as indicated by the dot-dash lines in FIG. 10. When the eye 91 reaches an approximate central point, as shown in FIG. 10, the member 42 of station 38' is rotated to provide the twist in the strand 43, this twist being clearly diagrammatically shown at 43' in FIG. 18 of the drawing. Also considering this figure, it will appear that, upon closing of the dies at station 38', the molding of a nubbin 125' will be formed on the twist 43'.

At this time, it must be kept in mind that the eye 91 is in constant movement. In other words, it continues in the direction of the arrow 163, FIG. 10, to pass upwardly over the anvil 153 of station 38, downwardly between the open dies beneath and around the member 42 and then again between the dies and downwardly beneath the anvil 153 and, again, upon the eye 91, reaching a more or less central position, as shown in FIG. 10, the strand 43 will be twisted at station 38, the dies closed and another nubbin 125' formed.

In the above cycle of operations of each of the stations 38, 38', the knife 151 will be actuated at each station after the closing of the dies to cut the strand in the formation of the successive workpieces.

Considering FIG. 11 of the drawing, here is a diagrammatic illustration, wherein a looped snell end product 164 has been formed by actuation of the knife 151 at station 38' and removal of the loop 124 from 42 at station 38 with the loop 124 positioned on the finger 122. Here, it will be noted that the knife 151 is shown in its raised position at station 38. However, in completing the cycle of operation, the knife 151 of station 38 will then cut the strand 43 lying over the anvil 153 at station 38 to form the product 164', shown in dotted lines at station 38' and positioned on the finger 122 of this latter station. In the performance of the last workpiece 164, it will be apparent that the finger 91 of FIG. 11 has positioned the strand 43 on the parts at station 38', similar to the position of the strand with respect to the parts of station 38 as and when the workpiece 164 has been formed and ejected. In other words, the strand 43 is at all times in engagement with the parts at one of the stations 38, 38'. The trimming operation adjacent the twist, as at 43" FIG. 18, clearly illustrates that there is no waste of the material, as the cut end becomes the end of the leader strand extending from the molded nubbin 125 on the twist. For purposes of description, the strand may be said to have scribed modified numeral eights at each of the stations 38, 38' in the upward and downward passage over 42 and 153.

In FIG. 13 of the drawing is shown a block 165 secured to the face of the gear 74. This block operatively strikes a spring-loaded stop pin 166 as and when the shaft 36 is rotated in the direction of the arrow 167 in the twisting cycle of operation, preparatory to the closing of the dies for the molding operation.

After the dies are opened and the loop 124 has been ejected from the member 42, the shaft 36 is then rotated in the opposite direction to the arrow 167; whereupon, the block 165 strikes another spring-loaded stop pin 168, as will appear in this figure. The purpose of the stop pins is to reduce the shock or, in other words, to act as shock absorbers.

The above described operation of passing the strand 43 around the members 42 of the rods 39, 39', these members are in their outwardly extended positions, for example, as shown in full lines in FIG. 10 and the showing of one of the members 42 in full lines in FIG. 8. However, as and when the twists are formed in the strand, the rods 39, 39' are fed inwardly to compensate for the take-up in the strand by operation of levers 46, 46'. These positions of the members 42 are indicated in dotted lines in FIG. 10 and the dotted showing of the member 42 in FIG. 8 of the drawing.

It will be noted that the springs 169, FIG. 1, act upon the levers 46, 46' to maintain the same in constant engagement with the cams 48, 48'.

With machines of the type and kind under consideration, end products, generally similar to the products 164, can be produced in another method by dispensing with the molding operation and substituting for the dies 49 and 50 other types of forming dies such, for example, as a punch or horn 170 operating in conjunction with an anvil 171, the latter being recessed, as seen at 172, to receive the twist 43" in a modified end product 164", having a loop 124', as seen, in part, in FIG. 15 of the drawing. In actuating the punch 170 by an ultrasonic instrument, constituting part of the machine, a weld of the nylon strand will be established on the twist 43" by the high speed supersonic vibration blows which would be contributed to the punch 170. It will, of course, be understood that two of the welding units 170, 171 will be employed and the operation of the machine will be so timed as to compensate for the welding operation, as will be apparent to those skilled in the art.

In FIG. 16 of the drawing is shown another variation, wherein molded bodies, as at 173, will be formed at each of the molding stations 38, 38' on nylon or other strands 174 or twisted portions thereof, as diagrammatically seen at 175, with loops 176 formed in the strand and the resulting end products comprising the molded bodies 173 and the loops 176 will be formed by severing the strand adjacent the bodies 173 by trimming knives 177, which would be generally similar to the knives 151, as shown in FIGS. 1, 8 and 10 of the drawing.

Figure 18:
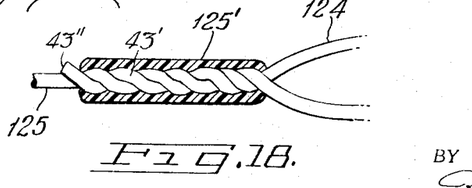
FIG. 18 is an enlarged sectional view of the twist in the workpiece snell showing the molded body in section.

From a consideration of FIG. 16 of the drawing, it will be apparent that many types and kinds of molded bodies can be formed of different shapes and contours rather than the simple nubbins, as at 125' of FIGS. 11 and 18 of the drawing. The loops 176 can form fingerpieces in conjunction with the molded members 173 for support and handling of the same.

Having fully described my invention, what I claim as new and desire to secure by Letters Patent is:

1. A machine of the character described employing two spaced strand looping and twisting stations, means movable between said stations for feeding a plastic strand, means at each station for forming a loop in said strand, means for rotating said last named means in forming a twist in said strand adjacent said loop, means at each station for retaining the twist in said strand, means at each station for severing the strand in forming, in each cycle of operation of the machine, two end products, each product comprising a retained twist and a loop adjacent said twist, and means at each station for ejecting the formed end product from said second named means of each station.

2. A machine as defined in claim 1, wherein the first named means comprises an elongated strand guiding arm, means for oscillating said arm on a movable axis to feed the strand through substantially eight-shaped paths at each of said stations in looping the strand around a loop forming member on said second named means and in crossing the strand in alinement with the fourth named means.

3. A machine as defined in claim 2, wherein each of said stations include a stationary anvil holder, above and below which the strand is guided by said arm, and said fifth named means operating in connection with the anvil of said holder in severing the strand.

4. A machine as defined in claim 3, wherein end product catch fingers are detachably mounted in the machine, and said fingers having ends positioned adjacent loop forming members of the third named means when said loop forming members are adjacent the fourth named means of the stations.

5. A machine as defined in claim 1, wherein said fourth named means comprises a pair of dies for molding a plastic nubbin on the twist in said strand.

6. A machine as defined in claim 1, wherein said fourth named means comprises a punch and anvil combination establishing a weld of the twist by high speed vibratory action of said punch.

7. A machine as defined in claim 1, wherein said fourth named means comprises a pair of dies for molding a plastic body on the twist in said strand.

8. A machine as defined in claim 1, wherein the third named means comprises a cam actuated rack operating a gear train geared to the second named means, and other means controlling movement of the second named means toward and from the fourth named means.

9. A machine as defined in claim 1, wherein the fourth named means comprises a pair of dies, means comprising a pair of gear segments for actuating said dies, a cam operating a link lever mechanism in simultaneously actuating both pairs of segments and dies, and link means coupled with said pair of gear segments for adjusting operation of the segments in controlling actuation of said dies.

10. A machine as defined in claim 9, wherein said fifth named means is actuated through a slide operatively engaging one of said dies.

11. A machine as defined in claim 9, wherein said gear segments actuate the dies through spring means operating directly upon die holders.

12. A machine as defined in claim 1, wherein said spaced stations, second named means, fourth named means, fifth named means and sixth named means are all mounted in connection with a front plate on the machine and removable with said plate in gaining access to the various drives for actuating the second, fourth, fifth and sixth named means.

13. A machine as defined in claim 1, wherein said sixth named means comprises an air actuated finger positioned adjacent the fourth named means and a loop forming member on the second named means.

14. A machine as defined in claim 1, wherein an air blast nozzle is positioned between said stations for ejecting the severed strand in the delivery of the end product from each station simultaneously in the actuation of the last named means.

15. A machine as defined in claim 14, wherein end product catch fingers are detachably mounted in the machine, said fingers having ends positioned adjacent loop forming members of the third named means when said loop forming members are adjacent the fourth named means of the stations, detachable mounting of each of said fingers comprising a plate in which the finger is mounted, an end product retaining sleeve fixed to the pin preventing detachment of the end products from the pin when removed from the machine, and a spring actuated retainer mounted on said plate and operatively engaging said sleeve.

16. A machine as defined in claim 1, wherein the fourth named means comprises a pair of relatively movable dies, means for pressure injecting plastic material into one of the dies for delivery of such material to cavities formed between the dies, containers mounted on the last named means for supporting supply of plastic material for delivery to the injecting means, and cam actuated means for moving said injecting means relatively to said one die.

17. A machine as defined in claim 16, wherein means is employed for agitating the plastic supply in each of said containers.

18. A machine as defined in claim 1, wherein the machine includes two forwardly and backwardly arranged cam shafts having cams thereon for actuating said first named means, means for driving one of said cam shafts, another longitudinally extending cam shaft geared directly to the driven cam shaft, said longitudinal cam shaft having a gear drive to the other of said first named cam shafts, and said longitudinal cam shaft having cams for actuating the third named means and said fourth named means.

References Cited
UNITED STATES PATENTS

| | | | |
|---|---|---|---|
| 1,728,273 | 9/1929 | Hall | 18—5 |
| 2,996,087 | 8/1961 | Gater | 140—104 |
| 3,225,795 | 12/1965 | Hogan et al. | 140—104 |
| 3,237,658 | 3/1966 | Ehmann | 140—104 |

WILBUR L. McBAY, *Primary Examiner.*